United States Patent [19]

Volchek et al.

[11] Patent Number: 5,556,545

[45] Date of Patent: Sep. 17, 1996

[54] REMOVAL OF ARSENIC FROM AQUEOUS LIQUIDS WITH SELECTED ALUMINA

[75] Inventors: Konstantin Volchek, Burlington; Saviz Mortazavi, Nepean; Harry Whittaker, Manotick, all of Canada

[73] Assignee: Her Majesty the Queen in right of Canada, as represented by The Secretary of State for the Environment, Ottawa, Canada

[21] Appl. No.: 205,486

[22] Filed: Mar. 3, 1994

[30] Foreign Application Priority Data

Mar. 4, 1993 [CA] Canada ..................................... 2090989

[51] Int. Cl.⁶ ..................................................... C02F 1/28
[52] U.S. Cl. .......................... 210/651; 210/665; 210/669; 210/676; 210/911
[58] Field of Search ..................................... 210/665, 669, 210/675, 676, 688, 912, 651, 911

[56] References Cited

U.S. PATENT DOCUMENTS 4,154,675  5/1979  Jowett et al. ........................... 210/675
4,824,576  4/1989  Sood et al. .............................. 210/688
5,338,460  8/1994  Yen ......................................... 210/912

*Primary Examiner*—Ivars Cintins
*Attorney, Agent, or Firm*—Alan A. Thomson; Robert A. Wilkes

[57] ABSTRACT

The removal of arsenic, from aqueous liquids by adsorption on alumina, is facilitated by selecting the alumina adsorbent to have a particle size below about 200 micrometers, forming a slurry of the alumina and aqueous liquid and agitating the slurry. It has been found that alumina can be selected to have a particle size sufficiently small, or preferably a combination of both particle size sufficiently small and pore size and number sufficiently large, to achieve 50 ppb or less arsenic within about 2 hours treatment. The alumina with adsorbed arsenic is separated from the slurry by steps preferably comprising microfiltration. A precipitation pretreatment can be combined with the slurry treatment e.g. to handle more concentrated solutions.

12 Claims, 1 Drawing Sheet

REMOVAL OF ARSENIC FROM AQUEOUS LIQUIDS WITH SELECTED ALUMINA

This invention is directed to the treatment of aqueous liquids to remove dissolved arsenic by use of alumina adsorbent. The treatment is facilitated by selecting the alumina to have a very small particle size or preferably a small particle size with relatively large pores, and agitating as a slurry formed with the aqueous liquid. The alumina with adsorbed arsenic is separated e.g. by microfiltration.

BACKGROUND AND PRIOR ART

Contamination of aqueous liquids with arsenic is a significant problem: e.g. natural groundwater in some locations, effluents from some mining operations, and wastewaters at certain industrial sites, have toxic levels of this element. Environmental authorities in Canada and United States currently have set the maximum level of arsenic in potable water at 50 ppb while the maximum level for dischargeable water is set at 50 ppb. Groundwaters at some locations in North America contain arsenic at levels up to about 100,000 ppb. Certain mining leachates and effluents from certain industrial and agricultural operations contain arsenic at concentrations as high as several hundred ppm.

There are several techniques currently used for the removal of arsenic from water, leachates or affluents.

a. Chemical precipitation

This method is based on the addition of chemical reagents to arsenic-contaminated water resulting in the formation of insoluble arsenic compounds. This technique is presently used in most mining leachate treatment plants and is effective for water contaminated with high levels of arsenic. The main disadvantage of this technique is its inability to reach the low concentrations of arsenic set out by the Environmental authorities. This treated water would have to be diluted with fresh or other treated water in order to achieve discharge limits. Several hundreds of ppb's is a typical residual concentration after treatment.

b. Ion exchange on polymeric resins

This technique is satisfactory only in the absence of higher concentrations of background salts, especially sulphates. Normally, groundwater has a relatively high level of inorganic substances resulting in the poor selectivity of the resins for arsenic. As a result, this method does not find broad industrial application for arsenic removal.

c. Filtration

This technique can be successfully used only if arsenic is present in an insoluble form, otherwise the effectiveness of this method is low.

d. Adsorption on inorganic adsorbents

It has been documented that the sorption of arsenic by inorganic adsorbents, especially activated alumina, can be very effective. The residual concentration of arsenic can be as low as several ppb. This technique is less sensitive than ion exchange on polymeric resins in the presence of larger quantities of background salts. It can, therefore, be used for the treatment of highly mineralized groundwater and mining leachates. This process, however, is relatively slow due to the slow diffusion of arsenic ions inside the granules of the adsorbent. It normally takes one or more days to achieve saturation of the adsorbent used.

It must be concluded that none of the existing technologies used for arsenic removal is ideal and universally applicable. Improvement of existing methods and the development of new techniques are, therefore, an environmental necessity.

Typical references describing the alumina adsorption currently used are the following.

Report EPA-600/2-83-107, Oct. 1983 US-EPA) E. Rosenblum & D. Clifford "The Equilibrium Arsenic Capacity of Activated Alumina" reviews various arsenic removal techniques (from water) and describes various tests using granular alumina (300–600 micrometers) in both batch and column modes. In a batch test using 3.33 g alumina per liter, almost one day was needed for removal of arsenic from about 4.5 ppm to the 50 ppb level (Table E-1 Appendix E).

U.S. Pat. No. 4,923,843 May 8, 1990 E. K. Saforo et al mentions using small alumina particles in the formation of a larger cementitious composite with activated carbon.

U.S. Pat. No. 5,118,655 Jun. 2, 1992 P. M. Pedersen et al describes the use of activated alumina of 50 to 100 mesh size to form a composite with active carbon and silicates, the composite being used in a canister or cartridge for water treatment.

It is evident that in the prior art where alumina adsorbent was used in water treatment it was used in the form of granules larger than 48 mesh (300 micrometers) size or as a component in forming a composite e.g. a larger granular composite or in a multicomponent medium. The prior art avoided using fine particles of alumina per se in water treatment, including treatment for arsenic removal.

While arsenic removal using granular alumina is reasonably effective it has the disadvantage of long treatment time with relatively large hold-up volumes. We have found it possible to significantly decrease the treatment times and thereby increase the overall efficiency of this process.

SUMMARY OF THE INVENTION

The invention sets forth a process for removing arsenic from aqueous liquids, comprising, a) contacting the aqueous liquid with activated alumina adsorbent selected to have a particle size below about 200 micrometers diameter and sufficiently small, or in combination pore number and pore diameter sufficiently large in particles sufficiently small, to achieve removal to 50 ppb or less arsenic within about 2 hours, and agitating until the desired adsorption is achieved, b) separating the loaded adsorbent from the liquid, and c) recovering water substantially free of arsenic. Stage a) is most suitably carried out by agitating a liquid slurry of the feed liquid and the adsorbent.

It is preferred that separation stage b) comprises a microfiltration with a membrane able to reject the alumina particles. Concurrently or alternatively this separation stage may comprise a centrifugation or liquid cyclone separation tuned to remove alumina particles below 200 micrometers diameter. Other possible methods include flocculation and settling, or flotation.

The aqueous liquid feed may be pretreated to precipitate arsenic particularly if the feed concentrations are above about 5 ppm. Optionally arsenic concentrate from alumina adsorbent regeneration can be fed to this pretreatment, and all the arsenic removed in solid form.

DETAILED DESCRIPTION

Figure 1:
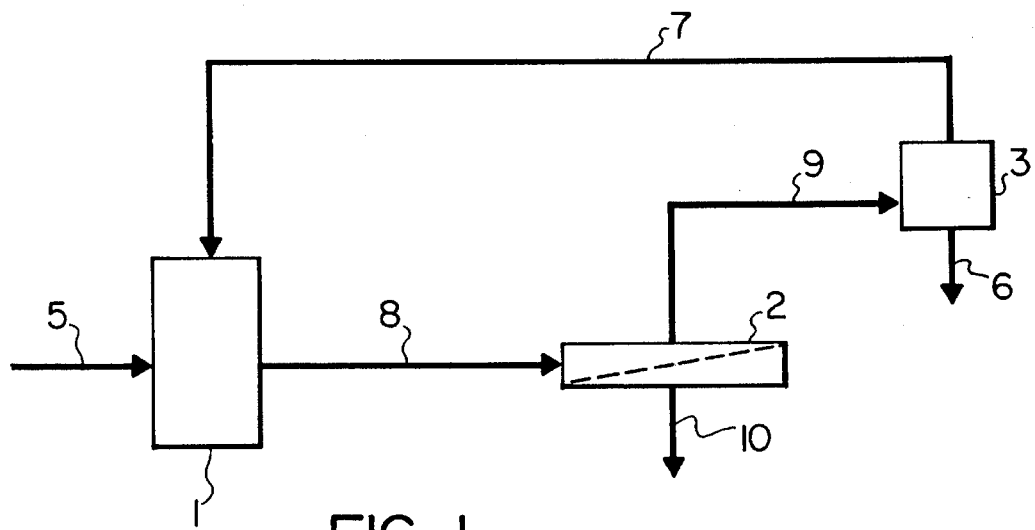
FIG. 1 is a simplified flowsheet where the adsorbent is regenerated and recycled.

To facilitate arsenic removal to acceptable levels by adsorption an important objective is to achieve arsenic levels below 50 ppb within 2 hours adsorption time. We have found that this objective can be achieved by agitation in the presence of activated alumina adsorbent below about 200 micrometers diameter and either sufficiently small or with sufficient porosity (preferably from pores above about 100 Angstroms pore diameter) to achieve this objective.

The amount of activated alumina adsorbent used per liter of aqueous liquid treated should not exceed about 3.5 g because higher amounts result in higher viscosities requiring excessive energy consumption for mixing, pumping, etc., in higher consumption and possibly higher losses of alumina. This all leads to a higher process cost and makes the higher alumina process technically less feasible. It is preferred that the adsorbent be used in the range of about 1.0–3.5 g/L to facilitate solid-liquid contact and separation of loaded adsorbent. At the lower end of this range, the particle size should be small enough or the pores large enough that the above objective is realized.

The aqueous liquids to be treated can be any of the following: groundwater, surface water, mining leachates, and industrial effluents. The concentration of arsenic in such liquids can range from about 0.5 to about 400 ppm. The present adsorption process is most suitable for reducing levels or arsenic of about 0.5 to about 5 ppm to below the acceptable limit of 50 ppb. Where the feed liquid has concentrations above about 5 ppm, a pretreatment preferably is used to reduce the arsenic content to below this value. Such pretreatments include precipitation with reagents such as ferric sulphate or chloride, together with lime. The precipitate can be separated by settling and removed. These pretreatments per se are known in the art.

The alumina adsorbent can be any activated alumina known for water treatment and usually is available in granular sizes ranging from about 4 mesh (4.75 mm) to about 50 mesh (300 micrometers) suitable for packed beds. We have found it necessary to crush the granular alumina and select the desired particle size range. Aluminas with high porosity in pores larger than about 100 Angstroms diameter have been found to be preferred. Most preferably the pore diameters are from 300–1000 Angstroms. One example of such alumina is 20 micrometer diameter wide pore (300 Angstroms) alumina supplied by Scientific Adsorbents Inc. The desired particle size material from crushed granules is obtained by screening or by cycloning.

The arsenic ions usually present in water at neutral and slightly acid pH are understood to be $H_2AsO_4^-$ and $HAsO_4^{2-}$. For adsorption the arsenic should be in its higher valence form (V). If in valence III form, the arsenic should be oxidized (e.g. with aeration) to the higher valence.

It has been found preferable to form a slurry for the contacting state. The slurry of feed liquid and adsorbent (at about 1.0–3.5 g alumina/L) preferably has or is adjusted to have, a pH of about 5–7 (most preferably 5–6) to facilitate the adsorption. The rate of adsorption is increased by agitating the slurry during the contacting stage. Suitable agitation can be achieved by mixers, pumps or stirrers, by tumbling or shaking a partially-filled container, or by aeration means. The agitation should be extensive enough to keep all adsorbent particles in the suspended state.

Temperatures during the contacting can be ambient, or up to about 50° C.

When the desired reduction in dissolved arsenic has been achieved, the slurry is fed to a separation stage. It is preferable to effect the separation by steps comprising microfiltration using membranes selected to retain the fine alumina particles. Pore sizes of such membranes usually range from about 0.05 to about 20 micrometers, with 0.1–1 commonly used. The latter will be operative in most cases unless very fine particles are present in which case membranes with smaller pore sizes should be selected. Although tubular membranes are preferred, the membranes may be in the form of a sheet, or tube, or other suitable shape. Relatively low applied pressures of from 20 to 350 Kpa (3–50 psi) are used to force the water through the membrane. In case of membrane fouling, the alumina may be removed from the membrane by backwashing to form a concentrate or by mechnical removal. During membrane filtration, the flow tends to propel the alumina through the membrane zone and prolonged use is possible without alumina removal steps.

As an alternative to microfiltration, the separation may comprise centrifugation e.g. by feeding the slurry to centrifuge(s) tuned to separate out the fine alumina. The centrifugation can be combined as a pretreatment to microfiltration. A series of cyclones e.g. in the form of a cascade could also be used.

The time required for microfiltration may vary widely depending on the operating conditions and membrane selected.

The separated alumina may be treated to release arsenic and regenerated for recycle. The alumina can be regenerated by adjusting the pH of the alumina concentrate to about 9–12 to release arsenic and removing the alumina e.g. by microfiltration. The arsenic released from the alumina as a concentrated solution can be treated by chemical precipitation and the precipitate handled by conventional techniques. Regeneration time is reduced compared to granular alumina.

Alternatively to regeneration, the saturated alumina can be stabilized e.g. by incorporating into a glass matrix, for appropriate disposal.

Water is recovered which meets discharge limits as far as arsenic is concerned. If unacceptable limits of other elements such as lead, mercury or chromium remain, the water can be subject to further treatment e.g. chemical precipitation ion exchange, reverse osmosis etc.

Referring to FIG. 1, the arsenic contaminated water 5 is combined with fresh (or regenerated 7) adsorbent in solid-liquid contact vessel 1 and the resulting slurry agitated (e.g. for 0.1–2 hours depending on the conditions), and the slurry then fed to separation unit 2. Treated water 10 is removed from unit 2 for discharge or other processing while an alumina concentrate 9 is fed to regeneration unit 3. From unit 3 an arsenic concentrate 6 is removed for conventional post-treatment and regenerated adsorbent 7 returned to vessel 1.

Referring to FIG. 1, contaminated water 5 is fed to precipitation unit 4 and contacted with precipitation agent 13, and optionally arsenic concentrate 6. The precipitated sludge 11 is removed for conventional treatment and the decanted water 12 passed to contact vessel 1 for processing as in FIG. 1. Preferably the arsenic concentrate 6 from regeneration unit 3 is fed to precipitation unit 4, and the arsenic removed in solid (sludge) form 11.

A preferred apparatus for contact vessel 1 is a stirred tank, or vessel. Other suitable means are vessels with circulation pumps or aerators. For separation unit 2 a preferred apparatus is a microfiltration module with tubular membranes. A series of liquid cyclone separators or centrifuges could be used in unit 2. For regeneration unit 3, suitable apparatus includes a contact vessel as for 1 in FIG. 1 combined with microfiltration unit or liquid cyclone separator unit. For precipitation unit 4 suitable apparati include settling tanks or thickeners.

The following examples are illustrative.

EXAMPLE 1

A sample of a commercially-available activated alumina (made by Scientific Adsorbents Inc. designated "A") was crushed and one particle size fraction of 0–5 micrometers diameter, was separated. A size fraction of 0–20 micrometers diameter of type "A" activated alumina with a larger pore size was used as well. A second type of activated alumina (made by Alcan Ltd. and designated "B") had a particle size of 1.4–2.36 millimeters, and was tested for comparison. The aqueous liquid to be treated had an initial concentration of arsenic of 2.9–3.6 ppm and 100 ml volume was used in each test run. Three separate runs were carried out with the pH of each being adjusted to 5.0 or 6.0 (with sodium hydroxide or nitric acid) before each run. Uncrushed alumina "B" was added to one test volume at 3.0 g/L. The fraction of 0–5 micrometers of "A" was added to the second test volume at 3.65 g/L. The 0–20 micrometer fraction of alumina "A" was added to the third test volume at 2.89 g/L. Each 100 ml test volume was agitated in a plastic bottle by a shaker table. Samples were taken at various times and dissolved arsenic concentration measured using atomic absorption for which the detection limit of arsenic was 10 ppb. The agitation was continued and the arsenic concentration followed for about 2 days or until 20 ppb level was reached.

Results are given in Table 1. For rough comparison, from the prior art US-EPA Report EPA-600/2-83-107 (referred to above) Appendix E Table E-1, the run with 3.333 g/L of 300–600 micrometer diameter activated alumina, is included in Table 1 as Column 2. While this prior art run started with a slightly higher concentration of arsenic, it is apparent that approximately one day (24 hours) was required to reduce the arsenic level to the 50 ppb level (see Column 2). The uncrushed alumina had little effect even after about 2 days (Column 1). The 0.–5 micrometer fraction of "A" was able to reduce the arsenic to the 50 ppb level in about 10 min (Column 4), while the wide pore 0–20 micrometer fraction of "A" achieved this level in less than 1 hour (Column 3).

TABLE 1

Concentration of Arsenic vs. Time for Different Tractions of AA.

| TIME | | AA Fractions (mm) | | | |
|---|---|---|---|---|---|
| MINUTES | HOURS | 1.4–2.36* Uncrushed "B" | 0.3–0.6** Prior Art | 0.–0.020 *** "A" | 0– 0.005**** "A" |
| 0 | 0 | 3250 ppb | 4525 ppb | 2890 ppb | 3650 ppb |
| 5 | 0.08 | | | 75 | 54 |
| 10 | 0.17 | 2750 | | 75 | 43 |
| 20 | 0.33 | | | | 28 |
| 60 | 1 | | | 41 | 20 |
| 240 | 4 | | | | |
| 720 | 12 | | 96 | | |
| 1440 | 24 | | 40 | | |
| 2880 | 48 | 2250 | 41 | | |
| 3760 | 96 | | 26 | | |
| 10080 | 168 | | 12 | | |
| 20160 | 336 | | 8 | | |

*3.0 g AA/L: pH 6
**US-EPA data: pH 8, 3.33 q AA/L (Prior Art)
***3.0 g AA/L: wide pore AA; pH 7
****3.0 g AA/L: regular pore AA; pH 7
Note:
The current experiments were carried out on solutions spiked with sodium arsenate.
Samples of activated alumina (AA) were different in sizes and sources as indicated.

It is evident that selecting a small particle size and most preferably also a wide pore size in the activated alumina, gave a surprising reduction in the time required to achieve the acceptable level of arsenic.

EXAMPLE 2

Using the same activated alumina (AA) "A" as in Example 1, and two of the same size fractions plus a third larger size fraction, similar tests to Example 1 were run and the arsenic concentration followed for 60 min. Parallel tests at initial pH 5 and 7 were conducted for each fraction and the results are summarized in Table 2. Amounts and conditions were as in Example 1.

TABLE 2

Concentration (ppb) of Arsenic vs. Time for Different Size Fractions of AA at pH 5 and pH 7.

| TIME | 0–0.005 mm "A" | | 0.038–0.104 mm "A" | | 0.104–0.212 mm "A" | |
|---|---|---|---|---|---|---|
| (min.) | pH 5 | pH 7 | pH 5 | pH 7 | pH 5 | pH 7 |
| 0 | 2890 ppb | 2890 | 2890 | 2890 | 2890 | 2890 |
| 5 | <10 | 122 | 13 | 889 | 20 | 990 |
| 10 | <10 | 122 | 14 | 806 | 23 | 831 |
| 20 | <10 | 122 | <10 | 663 | 18 | 881 |
| 60 | <10 | 77 | <10 | 564 | 11 | 607 |

Note:
The experiments were carried out on solutions spiked with sodium arsenate. Chemically identical AA (activated alumina "A") was used.

At pH 5, the 3 fractions achieved the 50 ppb level within 5 minutes, with the smaller size fractions being the more rapid. At pH 7 none of the fractions reached 50 ppb by 60 minutes and only the smallest sized fraction would reach this level by 2 hours.

It is evident that conditions including alumina particle size and initial pH need to be selected to achieve the 50 ppb arsenic level within 2 ours.

EXAMPLE 3

Figure 2:
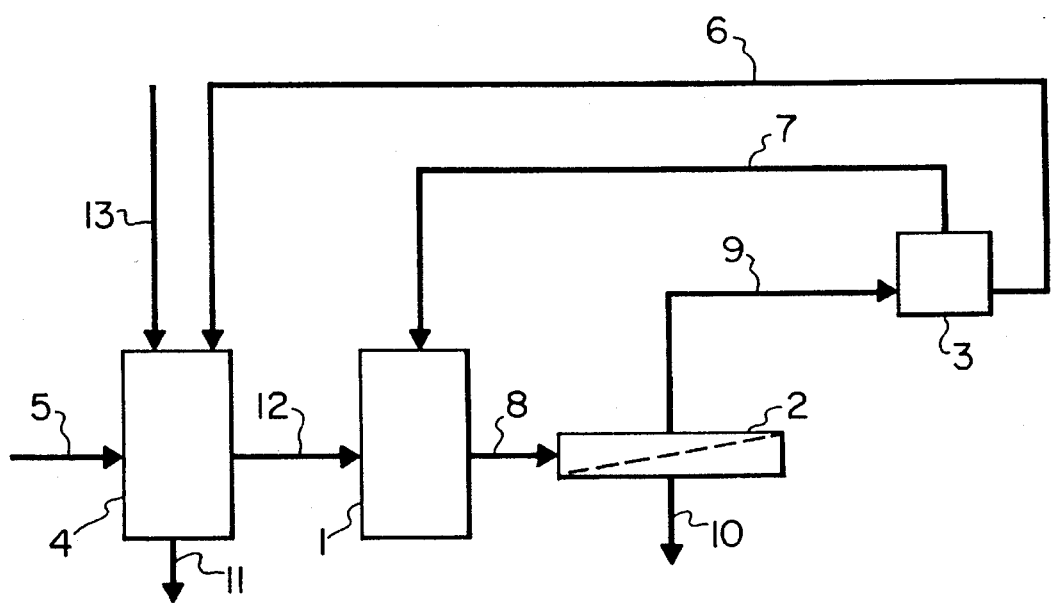
FIG. 2 is a flowsheet where a precipitation pretreatment is used combined with adsorbent regeneration and recycle of arsenic concentrate to the precipitation.

Tests were repeated using the same 3 size fractions of activated alumina "A" as in Example 2 except the aqueous liquid treated was a mining leachate (rain diluted) which had been pretreated by precipitation (as in FIG. 2) to give an arsenic level of about 70 ppb. Amounts and conditions were as in Example 1 and results are given in Table 3.

TABLE 3

Concentration of Arsenic vs. Time for Different Size Fractions of AA

| TIME | Particle Size (mm) | | |
|---|---|---|---|
| (min.) | 0–0.005 | 0.038–0.104 | 0.104–0.212 |
| 0 | 70 ppb | 70 ppb | 70 ppb |
| 5 | n/d | n/d | n/d |
| 10 | <10 | <10 | <10 |
| 20 | <10 | <10 | <10 |
| 60 | <10 | <10 | <10 |

Notes:
These experiments were carried out on real water (effluent) after chemical precipitation as in FIG. 2. Chemically identical AA designated "A" was used (the only difference was in the size).

The adsorption was very fast and low levels of arsenic (less than 10 ppb) were reached within several minutes. The limit of detection of arsenic was 10 ppb by the method used.

EXAMPLE 4

The treated mining leachate similar to that described in Example 3 was mixed with activated alumina designated "A" with the particle size 0–20 micrometers in a feed vessel. The volume of slurry was 2 L, the concentration of arsenic was 70 ppb, and the concentration of alumina was 3 g/L. The initial pH of slurry was 6.44.

The slurry was filtered through a polypropylene microfiltration membrane with average pore diameter 0.2 microns. The operating pressure was 1 Bar (14 psi). The permeate obtained was sent back to the feed vessel. Samples of the permeate were taken after 5 min., 10 min., 20 min., and 1 hour. The arsenic concentration below the detection limit, ie: 10 ppb, was found in all permeate samples. The membrane was effective in separating the alumina (no alumina particles were detected in the permeate).

The slurries from Example 1–3 can be subject to microfiltration to remove the alumina and the alumina regenerated, or discarded after stabilization.

The invention provides a very short duration process for attaining acceptable low levels of arsenic.

The embodiments of the invention in which an exclusive property or privilege is claimed are defined as follows:

1. A process for removing arsenic from aqueous liquids, comprising:

a) providing an aqueous liquid having a pH within the range of 5–7, and containing arsenic in its higher oxidation state ($As^V$) and contacting the aqueous liquid with activated alumina adsorbent selected to have a particle size below 200 micrometers diameter and with sufficient porosity and pore diameters above 100 Angstroms, to achieve arsenic removal to 50 ppb or less within 1 hour and agitating said aqueous liquid with said adsorbent until said removal is achieved;

b) separating the loaded adsorbent from the liquid; and c) recovering water with residual arsenic concentration of 50 ppb or less.

2. The process of claim 1 wherein the contacting stage a) comprises agitating in a slurry form.

3. The process of claim 1 wherein in stage a) the liquid pH initially is within the range of 5 to 6 and the adsorption is achieved within 5 minutes.

4. The process of claim 1 wherein separation stage b) comprises a microfiltration with a membrane selected to have pore diameters smaller than the alumina particles.

5. The process of claim 1 wherein the separation stage b) comprises a centrifugation or hydrocyclone separation selected to remove at least a portion of the alumina particles.

6. The process of claim 1 wherein loaded adsorbent from stage b) is treated to release arsenic, and recycled.

7. The process of claim 1 wherein the adsorbent in stage a) has a particle size within the range of about 5–100 micrometers.

8. The process of claim 7 wherein separation stage b) comprises a microfiltration step with a membrane of pore size ranging from 0.1–1 micrometer.

9. The process of claim 1 wherein the adsorbent has a particle size below about 20 micrometers diameter.

10. The process of claim 9 wherein separation stage b) comprises a microfiltration step with a membrane of pore size ranging from 0.1–1 micrometer.

11. The process of claim 1 wherein, before stage a), the aqueous liquid is pretreated with reagent to precipitate arsenic and the precipitate removed.

12. The process of claim 11 wherein the adsorbent is regenerated after stage b) and arsenic concentrate from the regeneration is fed to the precipitation pretreatment.

* * * * *